United States Patent
Xie et al.

(10) Patent No.: US 10,288,228 B2
(45) Date of Patent: May 14, 2019

(54) LAMP FIXTURE AND SURFACE MOUNTED TUBE LAMP

(71) Applicant: Xiamen Guangpu Electronics Co., Ltd., Fujian (CN)

(72) Inventors: Zhi Fu Xie, Fujian (CN); Zong Hui Chen, Fujian (CN); Yao Wei Zhou, Fujian (CN)

(73) Assignee: XIAMEN GUANGPU ELECTRONICS CO., LTD., Xiamen, Fujian (CN)

( * ) Notice: Subject to any disclaimer, the term of this patent is extended or adjusted under 35 U.S.C. 154(b) by 6 days.

(21) Appl. No.: 15/653,182

(22) Filed: Jul. 18, 2017

(65) Prior Publication Data
US 2018/0299079 A1    Oct. 18, 2018

(30) Foreign Application Priority Data
Apr. 13, 2017    (CN) .................... 2017 2 0385580 U

(51) Int. Cl.
*F21K 9/237*    (2016.01)
*F21K 9/235*    (2016.01)
*F21V 15/01*    (2006.01)
*F21Y 103/00*    (2016.01)
*F21Y 115/10*    (2016.01)

(52) U.S. Cl.
CPC .............. *F21K 9/235* (2016.08); *F21K 9/237* (2016.08); *F21V 15/013* (2013.01); *F21Y 2103/00* (2013.01); *F21Y 2115/10* (2016.08); *Y02B 20/386* (2013.01)

(58) Field of Classification Search
CPC ........ F21K 9/235; F21K 9/237; F21V 15/013; F21Y 2103/00; F21Y 2103/33; F21Y 2103/37; F21Y 2103/20; Y02B 20/386
See application file for complete search history.

(56) References Cited

U.S. PATENT DOCUMENTS

| 3,185,836 | A | * | 5/1965 | Flaugher | ................. | F21L 14/00 |
| | | | | | | 362/216 |
| 2009/0045715 | A1 | * | 2/2009 | Shantha | .................. | F21V 19/04 |
| | | | | | | 313/51 |

* cited by examiner

*Primary Examiner* — Y M. Lee
(74) *Attorney, Agent, or Firm* — Muncy, Geissler, Olds & Lowe, P.C.

(57) ABSTRACT

The invention relates to a lamp fixture and a surface mounted tube lamp. The lamp fixture comprises a bottom cover and a hanging board, wherein the hanging board comprises a hanging board body; the hanging board body has two ends both provided with downward bent edges; the bent edges at the two ends are respectively provided with first fixing members and second fixing members; the bottom cover is provided with first openings and second openings; the first openings and the second openings are respectively internally provided with first fixing portions and second fixing portions; the first fixing members extend into the first openings to be articulated with the first fixing portions, and the second fixing portions are capable of rotating along with the bottom cover to be fixed with the second fixing members that extend into the second openings.

7 Claims, 2 Drawing Sheets

LAMP FIXTURE AND SURFACE MOUNTED TUBE LAMP

BACKGROUND OF THE INVENTION

Technical Field

The invention relates to a lamp fixture and a surface mounted tube lamp with the lamp fixture.

2. Description of Related Art

Surface mounted LED tube lamps are a kind of lighting lamps which are mounted on ceilings and radiate light down. Such LED tube lamps have the advantages of beautiful and elegant appearances, high brightness, safety, reliability, energy conservation and electricity conservation, and have been widely applied to various occasions such as households, offices and entertainment venues. At present, the common installation method of the surface mounted tube lamps is as follows: a hanging board is fixed on a ceiling first and then a lamp body is fixed on the hanging board by using screws. The whole installation process is inconvenient, and a relatively large clearance exists between the lamp body and the ceiling after installation, which affects the beautiful appearance.

BRIEF SUMMARY OF THE INVENTION

The objective of the invention is to provide a lamp fixture and a surface mounted tube lamp. The lamp fixture has a hanging board disposed on a bottom cover; the hanging board has one end articulated with the bottom cover and the other hand capable of being fixedly connected with the bottom cover. During installation, the hanging board is fixed on the ceiling first; then a lamp is rotated to and fixed on the hanging board, thus solving the problem of difficult installation of the existing surface mounted tube lamp and the problem of large clearance between the surface mounted tube lamp and the ceiling.

The specific solution is as follows:

A lamp fixture comprises a bottom cover and a hanging board, wherein the hanging board is installed on the bottom cover; the hanging board comprises a hanging board body; the hanging board body has two ends both provided with downward bent edges; the bent edges at the two ends are respectively provided with first fixing members and second fixing members; the bottom cover is provided with first openings and second openings; the first openings and the second openings are respectively internally provided with first fixing portions and second fixing portions; the first fixing members extend into the first openings to be articulated with the first fixing portions, and the second fixing portions are capable of rotating along with the bottom cover to be fixed with the second fixing members that extend into the second openings.

Preferably, each one of the first openings has a first relatively large opening portion and a first relatively small opening portion, while each one of the second openings has a second relatively large opening portion and a second relatively small opening portion, and each one of the first relatively large opening portions is adjacent to the corresponding one of the second relatively large opening portions; the first fixing members are smaller than the first relatively large opening portions and bigger than the first relatively small opening portions; the second fixing members are smaller than the second relatively large opening portions and bigger than the second relatively small opening portions; the first fixing members are capable of extending into the first openings from the first relatively large opening portions, and are limited by the first relatively small opening portions to sliding in the first openings without extending out, and the second fixing members are capable of sliding in the second openings; when the first fixing members and the second fixing members are respectively fixed at the first relatively small opening portions and the second relatively small opening portions, the hanging board is fixed with the bottom cover.

Preferably, the first fixing portions are first protruding blocks which are respectively positioned on two sides of the first relatively small opening portions and protrude downward; the middle portion of each one of the first protruding blocks is provided with a first groove matched with the corresponding one of the first fixing members; the second fixing portions are second protruding blocks which are positioned on two sides of the second relatively small opening portions and protrude downward; the middle portion of each one of the second protruding blocks is provided with a second groove matched with the corresponding one of the second fixing members; and the distance between each one of the first fixing members and the corresponding one of the second fixing members at the two ends of the hanging board body allow the first fixing members to be positioned in the first grooves and the second fixing members to be positioned in the second grooves.

Preferably, each one of the first protruding blocks is provided with first slopes on both sides along the sliding direction of the corresponding one of the first fixing members, and each one of the second protruding blocks is provided with a second slope on one side along the sliding direction of the corresponding one of the second fixing members and close to the corresponding one of the second relatively large opening portions.

Preferably, each one of the second grooves is provided with a stopper portion on a lateral side away from the corresponding one of the second relatively large opening portions, and when the second fixing members contact the stopper portions, the second fixing members are positioned in the second grooves.

The invention also discloses a surface mounted tube lamp, including a lamp body and a lamp fixture; the lamp fixture is installed on the lamp body, wherein the lamp fixture is the lamp fixture described above.

Preferably, the middle portion of the bottom cover is provided with a circular indentation, and the inner wall of the circular indentation is provided with at least one through-hole through which power wires pass.

Preferably, the hanging board is positioned above the circular indentation and is also provided with a second through-hole through which the power wires pass.

Preferably, the hanging board has two ends receptively provided with a first oval mounting hole and a second oval mounting hole, and the extension line of the long axis of the first oval mounting hole is vertical to the extension line of the long axis of the second oval mounting hole.

Compared with the prior art, the surface mounted tube lamp provided by the present invention has the following advantages:

1. The lamp fixture provided by the invention has the hanging board installed at the bottom cover; one end of the hanging board passes through the first openings on the bottom cover to be articulated with the bottom cover; the bottom cover of the lamp fixture can rotate around the articulated point such that the bottom cover is fixed at the other end of the hanging board. The whole installation process is convenient, and the whole installation process is visual, capable of further reducing installation time and improving installation efficiency.

2. The fixation mode of the lamp fixture provided by the invention can be a large-and-small-opening slip fixation mode; the whole installation process is convenient, and the installation is firm and can be operated by a single person, thus reducing installation cost; moreover, the clearance between the bottom cover and the ceiling is equal to the thickness of the hanging board, capable of achieving a visual effect of seamless installation.

3. The bottom cover of the surface mounted tube lamp provided by the invention is also provided with a groove, so the installed power wires can pass through the grooves and enter the surface mounted tube lamp. The installation is not only simple, but also beautiful.

DETAILED DESCRIPTION OF THE INVENTION

Figure 1:
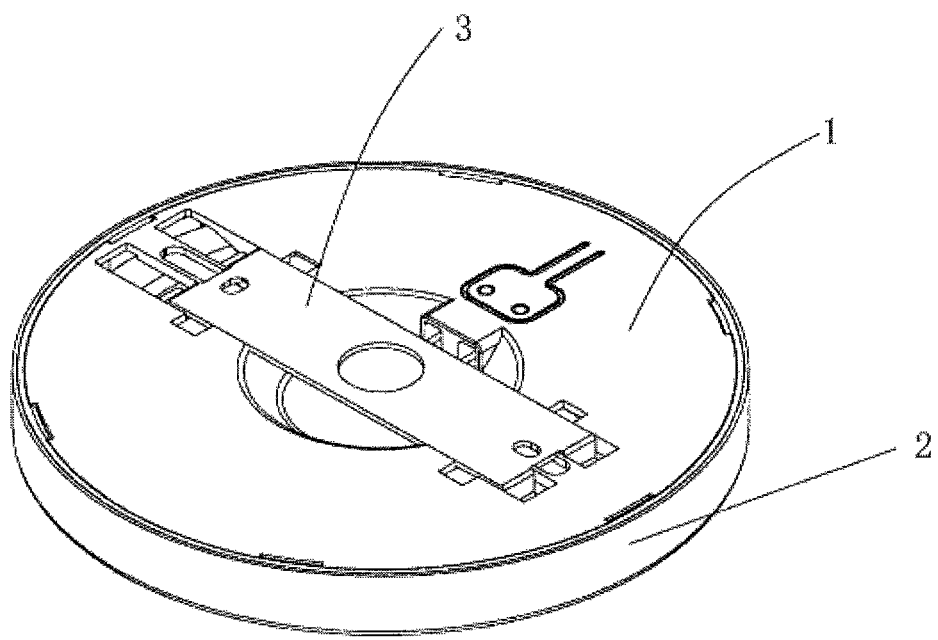
FIG. 1 is a schematic view of a lamp fixture.

In order to further describe the embodiments, the invention is attached with drawings. The attached drawings are a part of the disclosed content of the invention and mainly used to illustrate the embodiments, and can be combined with the related content of the Specification to explain the operation principle of the embodiments. With reference to those contents, those ordinarily skilled in the art should understand other possible embodiments and the advantages of the invention. Components in the drawings are not drawn by ratio, and similar component marks are usually used to represent similar components.

The invention is further described in conjunction with the attached drawings and specific implementation mode.

Embodiment 1

Figure 2:
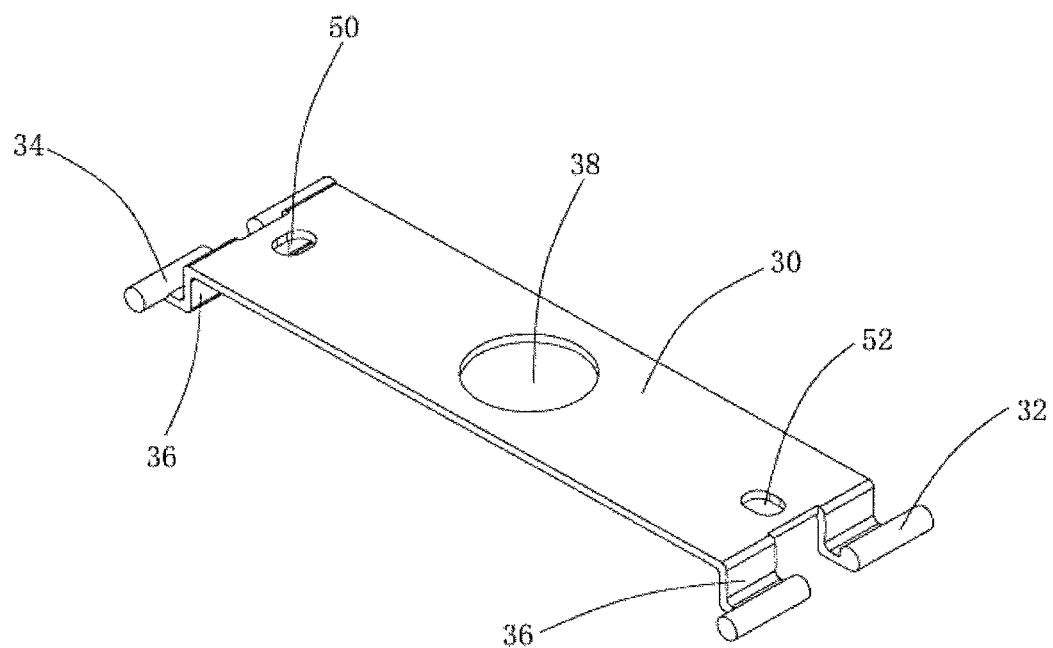
FIG. 2 is a schematic view of a hanging board.
Figure 4:
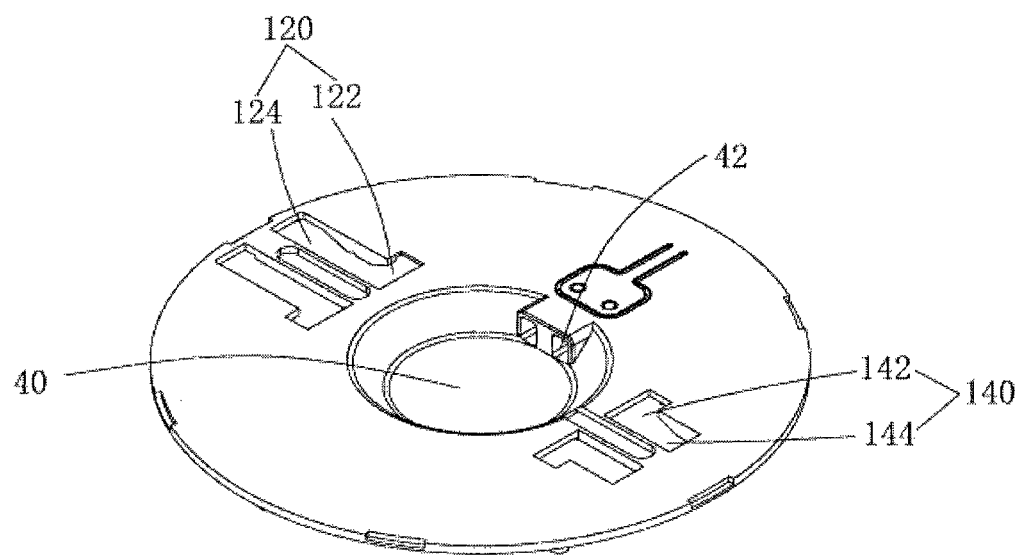
FIG. 4 is a schematic view of the front of the bottom cover.

As shown in FIG. 1, a lamp fixture provided by the invention includes a bottom cover 1 and a hanging board 3, wherein the hanging board 3 is installed on the bottom cover 1, and the hanging board includes a hanging board body 30. Refer to FIG. 2. The hanging board body 30 has two ends which are respectively provided with first fixing members and second fixing members, and the two ends are both provided with downward bent edges 36. The first fixing members 32 and the second fixing members 34 are respectively fixedly connected to lower end portions of respective bent edges 36 such that the first fixing members 32 and the second fixing members 34 are lower than the hanging board body 30, thus providing more operating space for installation. Refer to FIG. 4. The bottom cover 1 is provided with first openings 120 and second openings 140. First fixing portions 12 and second fixing portions 14 are respectively positioned in the first openings 120 and the second openings 140. The first fixing members 32 extend into the first openings 120 to be articulated with the first fixing portions 12, and the second fixing members 34 can extend into the second openings 140 to be fixed with the second fixing portions 14. Refer to FIG. 1. The fixed connection structure of the hanging board 3 and the bottom cover 1 ensures that when the bottom cover 1 is fixed on the hanging board 3, the bottom cover 1 can be tightly adhered to the hanging board. In this way, the distance between a lamp body and the mounting surface is the thickness of the hanging board 3, so the whole lamp achieves a visual effect of seamless installation after installation.

Refer to FIG. 2 and FIG. 4. As shown in the figures, each one of the first openings 120 has a first relatively large opening portion 122 and a first relatively small opening portion 124, while each one of the second openings 140 has a second relatively large opening portion 142 and a second relatively small opening portion 144, and each one of the first relatively large opening portions 122 is adjacent to the corresponding one of the second relatively large opening portions 142. The first fixing members 32 are smaller than the first relatively large opening portions 122 and bigger than the first relatively small opening portions 144. The second fixing members 34 are smaller than the second relatively large opening portions 142 and bigger than the second relatively small opening portions 144. The first fixing members 32 can slide in the first openings 120, and the second fixing members 34 can slide in the second openings 140. When the first fixing members 32 and the second fixing members 34 are respectively fixed at the first relatively small opening portions 122 and the second relatively small opening portions 142, the hanging board 3 is fixed with the bottom cover 1. Further, in a preferred solution, as shown in FIG. 3, the first fixing portions 12 are first protruding blocks which are respectively positioned on two sides of the first relatively small opening portions and protrude downward; the middle portion of each one of the first protruding blocks is provided with a first groove 126 matched with the corresponding one of the first fixing members 32; the second fixing portions 14 are second protruding blocks which are positioned on two sides of the second relatively small opening portions and protrude downward; the middle portion of each one of the second protruding blocks is provided with a second groove 146 matched with the corresponding one of the second fixing members 34; when the first fixing members 32 are positioned in the first grooves 126, the second fixing members 34 are positioned in the second grooves 146.

Figure 3:
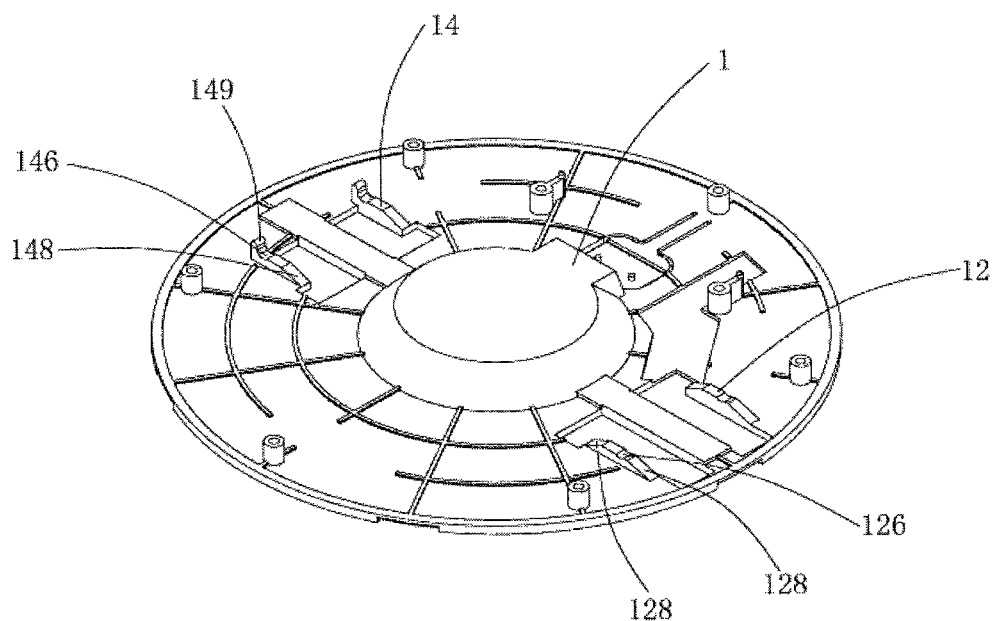
FIG. 3 is a schematic view of the back of a bottom cover.

Further preferably, as shown in FIG. 3, each one of the first protruding blocks is provided with first slopes 128 on the two sides along the sliding direction of the corresponding one of the first fixing members 32, wherein the inclinations of two first slopes on two sides of the first protruding blocks can be identical or different. Each one of the second protruding blocks is provided with a second slope 148 on one side along the sliding direction of the corresponding one of the second fixing members 34 and close to the corresponding one of the second relatively large opening portions 142. The slope design facilitates the sliding of the hanging board and makes the connection between the hanging board and the bottom cover more compact and solid. Refer to FIG. 3. More preferably, each one of the second grooves 146 is provided with a stopper portion 149 on a lateral side away from the corresponding one of the second relatively large opening portions 142, and when the second fixing members 34 contact the stopper portions 149, the second fixing members 34 are positioned in the second grooves 146.

Refer to FIG. 1-FIG. 4. The installation process of the lamp fixture is as follows. Fix the hanging board on the mounting surface first, then extend the first fixing members of the hanging boards into the bottom cover from the first relatively large opening portions, and move the first fixing members to the first relatively small opening portions such that the lamp body is hung on the first fixing members; after the lamp body is hung on the first fixing members, rotate the lamp body such that the second fixing members extend into the second relatively large opening portions; finally, move the lamp body along the length direction of the hanging board such that the second fixing members are pressed against the stopper portions. In such circumstances, the first fixing members are positioned in the first grooves, and the second fixing members are positioned in the second grooves, so the hanging board and the bottom cover are in fixed connection, completing the whole installation process. Such installation mode achieves a visual effect during the whole installation process, capable of further reducing the installation time and improving the installation efficiency.

Embodiment 2

This embodiment provides a surface mounted tube lamp and a lamp fixture. The lamp fixture is installed on a lamp body 2, wherein the lamp fixture is the lamp fixture described in embodiment 1. Preferably, the middle portion of the bottom cover is provided with a circular indentation 40, and the inner wall of the circular indentation is provided with at least one first through-hole 42 through which power wires pass. Further, as shown in FIG. 2, the hanging board 3 is positioned above the circular indentation 40 and is also provided with a second through-hole 38 through which the power wires pass. Refer to FIG. 1, FIG. 2 and FIG. 4. During installation of the surface mounted tube lamp, the external power wires can pass through the second through-hole 38 to enter the circular indentation 40, while the power wires of lighting components in the surface mounted tube lamp can extend out from the first through-hole 42, and the external power wires and the internal power wires of the surface mounted tube lamp are electrically connected in the circular indentation, so the whole power wiring is simple and beautiful.

Refer to FIG. 2. The hanging board 3 has two ends receptively provided with a first oval mounting hole 50 and a second oval mounting hole 52, wherein the extension line of the long axis of the first oval mounting hole 50 is vertical to the extension line of the long axis of the second oval mounting hole 52, thus limiting displacement of the hanging board caused by an external force and ensuring the stability of the installation.

The invention is presented and introduced in conjunction with the preferable embodiments, but those skilled in the art should understand that various changes in form and in detail can be made to the invention on the basis of the essence and protective scope of the invention defined by the attached Claims, which should all fall within the protective scope of the invention.

What is claimed is:

1. A lamp fixture, comprising a bottom cover and a hanging board, wherein the hanging board is installed on the bottom cover; the hanging board comprises a hanging board body; the hanging board body has two ends both provided with downward bent edges; the bent edges at the two ends are respectively provided with first fixing members and second fixing members; the bottom cover is provided with first openings and second openings; the first openings and the second openings are respectively internally provided with first fixing portions and second fixing portions; the first fixing members extend into the first openings to be articulated with the first fixing portions and the second fixing portions are configured to be fixed with the second fixing members that extend into the second openings;
wherein each one of the first openings has a first relatively large opening portion and a first relatively small opening portion, while each one of the second openings has a second relatively large opening portion and a second relatively small opening portion, and each one of the first relatively large opening portions is opposite to corresponding one of the second relatively large opening portions; the first fixing members are smaller than the first relatively large opening portions and bigger than the first relatively small opening portions; the second fixing members are smaller than the second relatively large opening portions and bigger than the second relatively small opening portions; the first fixing members are capable of extending into the first openings from the first relatively large opening portions, and are limited by the first relatively small opening portions to sliding in the first openings, and the second fixing members are capable of sliding in the second openings; when the first fixing members and the second fixing members are respectively fixed at the first relatively small opening portions and the second relatively small opening portions, the hanging board is fixed with the bottom cover; and
wherein the first fixing portions are first protruding blocks which are respectively positioned on two sides of the first relatively small opening portions and protrude downward from a surface of the bottom cover; a middle portion of each one of the first protruding blocks is provided with a first groove matched with the corresponding one of the first fixing members; the second fixing portions are second protruding blocks which are positioned on two sides of the second relatively small opening portions and protrude downward through the second relatively small opening portions; the middle portion of each one of the second protruding blocks is provided with a second groove matched with the corresponding one of the second fixing members; and a distance between each one of the first fixing members and the corresponding one of the second fixing members at the two ends of the hanging board body allow the first fixing members to be positioned in the first grooves and the second fixing members to be positioned in the second grooves.

2. The lamp fixture according to claim 1, wherein each one of the first protruding blocks is provided with first slopes on both sides along a first sliding direction of the corresponding one of the first fixing members from the first relatively large opening portions to the first relatively small opening portions, and each one of the second protruding blocks is provided with a second slope on one side along a second sliding direction of the corresponding one of the second fixing members from the second relatively large opening portions to the second relatively small opening portions and close to the corresponding one of the second relatively large opening portions.

3. The lamp fixture according to claim 2, wherein each one of the second grooves is provided with a stopper portion on a lateral side away from the corresponding one of the second relatively large opening portions, and when the second fixing members contact the stopper portions, the second fixing members are positioned in the second grooves.

4. A surface mounted tube lamp, comprising a lamp body and a lamp fixture, the lamp fixture being installed on the lamp body, wherein the lamp fixture is the lamp fixture according to claim 1.

5. The surface mounted tube lamp according to claim 4, wherein a middle portion of the bottom cover is provided with a circular indentation, and an inner wall of the circular indentation is provided with at least one first through-hole through which power wires pass.

6. The surface mounted tube lamp according to claim 5, wherein the hanging board is positioned above the circular indentation and is provided with a second through-hole through which the power wires pass.

7. The surface mounted tube lamp according to claim 4, wherein the hanging board has two ends receptively provided with an oval first mounting hole and an oval second mounting hole, and an extension line of a long axis of the oval first mounting hole is vertical to an extension line of a long axis of the second mounting holes.

* * * * *